(12) United States Patent
Hoskins

(10) Patent No.: US 7,705,099 B2
(45) Date of Patent: Apr. 27, 2010

(54) DRILLING FLUID AND METHOD FOR REDUCING LOST CIRCULATION

(75) Inventor: Terry W. Hoskins, Calgary (CA)

(73) Assignee: Canadian Energy Services, LP, Calgary, AB (CA)

( * ) Notice: Subject to any disclaimer, the term of this patent is extended or adjusted under 35 U.S.C. 154(b) by 219 days.

(21) Appl. No.: 11/729,775

(22) Filed: Mar. 30, 2007

(65) Prior Publication Data

US 2007/0244013 A1 Oct. 18, 2007

Related U.S. Application Data

(60) Provisional application No. 60/787,485, filed on Mar. 30, 2006.

(51) Int. Cl.
    *C08H 5/04* (2006.01)

(52) U.S. Cl. .................................. 527/103; 166/280.1

(58) Field of Classification Search ................. 507/103, 507/117, 138; 527/103
See application file for complete search history.

(56) References Cited

U.S. PATENT DOCUMENTS

| | | |
|---|---|---|
| 3,223,185 A | 12/1965 | Jongbloed et al. |
| 3,302,719 A | 2/1967 | Fischer |
| 3,316,965 A | 5/1967 | Watanabe |
| 3,342,263 A | 9/1967 | Fischer |
| 3,455,390 A | 7/1969 | Gallus |
| 3,593,794 A | 7/1971 | Fischer |
| 3,601,194 A | 8/1971 | Gallus |
| 3,630,280 A | 12/1971 | Fischer |
| 3,684,012 A | 8/1972 | Scheffel |
| 3,711,405 A | 1/1973 | Pye et al. |
| 3,753,903 A | 8/1973 | Fischer et al. |
| 3,870,668 A | 3/1975 | Fischer et al. |
| 3,882,029 A | 5/1975 | Fischer et al. |
| 3,954,629 A | 5/1976 | Scheffel et al. |
| 3,979,304 A | 9/1976 | Fischer et al. |
| 3,979,305 A | 9/1976 | Fischer et al. |
| 3,989,632 A | 11/1976 | Fischer et al. |
| 4,005,753 A | 2/1977 | Scheffel et al. |
| 4,192,753 A | 3/1980 | Pye et al. |
| 4,614,599 A | 9/1986 | Walker |
| 4,664,816 A | 5/1987 | Walker |
| 4,671,883 A | 6/1987 | Connell et al. |
| 4,704,213 A | 11/1987 | Delhommer et al. |
| 6,187,719 B1 | 2/2001 | Dino et al. |
| 6,258,756 B1 | 7/2001 | Hayatdavoudi |
| 6,803,347 B1 | 10/2004 | Ladva et al. |

FOREIGN PATENT DOCUMENTS

| | | |
|---|---|---|
| CA | 1063928 | 10/1979 |
| CA | 1267075 | 3/1990 |
| CA | 2161779 | 10/1994 |

OTHER PUBLICATIONS

Suyan et al., "Novel Cement Composition for Completion of Thermal Recovery (ISC) Wellbores", SPE/IADC 101848, pp. 1-6.
Fischer et al., "An Organic "Clay Substitute" for Nondamaging Water Base Drilling and Completion Fluids", Society of Petroleum Engineers of Aime, SPE 4651.
Gallus et al., "Fluid Diversion to Improve Well Stimulation", American Institute of Mining, Metallurgical and Petroleum Engineers, Inc., SPE 3811.

*Primary Examiner*—Timothy J. Kugel
*Assistant Examiner*—Atnaf Admasu
(74) *Attorney, Agent, or Firm*—Diederiks & Whitelaw PLC

(57) ABSTRACT

Lost circulation of drilling fluid is one of the most serious and expensive problems facing the drilling industry. The present invention relates to an improved drilling fluid for reducing or preventing lost circulation to an underground formation surrounding a well bore in the process of drilling a well. The drilling fluid comprises a base fluid and wax or waxy substance as a primary seepage loss agent. The invention also provides a method of reducing or preventing lost circulation to an underground formation surrounding a well bore in the process of drilling a well using the drilling fluid of the invention, wherein the primary seepage loss agent is added to the drilling fluid, either before or during drilling, and the drilling fluid is pumped down hole during drilling.

22 Claims, 3 Drawing Sheets

A)

B)

DRILLING FLUID AND METHOD FOR REDUCING LOST CIRCULATION

RELATED APPLICATIONS

This application claims the benefit of priority of U.S. Provisional Patent Application No. 60/787,485, filed Mar. 30, 2006, entitled "Method and Fluid for Drilling an Underground Formation", which is incorporated herein by reference in its entirety.

FIELD OF THE INVENTION

The present invention relates generally to drilling fluids and methods for reducing lost circulation to an underground formation in the process of drilling a well. More particularly, the present invention relates to a drilling fluid comprising wax or waxy substance as a primary seepage loss agent and a method of reducing or preventing seepage losses to an underground formation in the process of drilling a well using the drilling fluid of the invention.

BACKGROUND OF THE INVENTION

Drilling fluid, known as mud, performs several different functions essential to drilling an oil or gas well and enhances the overall efficiency of the drilling operation. Drilling fluid is used, for instance, to cool and lubricate the drilling tool, to reduce friction between the bit and the well bore, to control subsurface pressure in the well bore, to lift the drill cuttings and carry them to the surface, and to clean the well bore and drilling tool.

The major component of drilling fluid is its base fluid, which may be aqueous based, hydrocarbon based or an emulsion. Aqueous or water based drilling fluids are used frequently in the industry and the base fluid may be either fresh water or salt water. Hydrocarbon or oil based drilling fluids are also commonly used, as are invert emulsions (i.e. water in oil). To complete the drilling of complex wells in Western Canada and throughout the world, many operators have turned to hydrocarbon based drilling fluids. Today's drilling engineer has concerns that range from the complexity of well design to stabilizing the well bore under extreme hole conditions. Drilling complex wells creates costly operations and drilling with hydrocarbons allows operators some margin of confidence in completing drilling objectives.

When drilling engineers choose to drill with hydrocarbons there are still some issues for concern, the primary concerns being the cost of the refined base oil, which is directly tied to the price of world oil, and seepage losses or, in more severe cases, total losses, which rapidly increase the cost of drilling. Both the nature and the composition of drilling fluid contributes to the high cost of drilling, in terms of the materials, composition, chemical formulations, and manufacturing processes involved. The enormous volume of drilling fluid required to complete each operation also contributes to the high cost In the process of drilling a well, the drilling fluid is pumped into the well bore through the drill pipe and exits through nozzles in the drill bit. The drilling fluid then flows back to the surface through the annulus, which is the space between the drill pipe and the wall of the well bore. Back at the surface, the cuttings are removed and the mud is generally pumped back to a fluid tank where it can be reused and/or treated if necessary. The drilling fluid system is typically designed as a loop with the drilling fluid continually circulating as the drill bit rotates.

During the drilling operation, a portion of the drilling fluid may filter into the permeable subterranean formation surrounding the well bore and is therefore not returned to the surface for recirculation. This lost portion of drilling fluid that flows into the formation is generally referred to in the industry as lost circulation. Any lost circulation experienced has a significant economic impact on the operation. Lost circulation, particularly of hydrocarbon based drilling fluids, may also have a negative impact on the environment.

Lost circulation may occur in the form of seepage losses or fluid losses.

Seepage losses occur when whole fluids are lost to formations during drilling. This can occur, for example, when solids in the drilling fluid system are not large enough to serve as effective bridging agents for the porous or fractured formations. Mild to moderate seepage losses do not result in total loss of drilling mud to the formation but these losses nonetheless have a significant impact on the cost of drilling. Severe losses may be experienced in highly porous or fractured formations. The amount of seepage loss experienced depends on the structure and permeability of the formation being drilled. An area of a formation where seepage loss occurs is commonly referred to as a loss zone.

In contrast to seepage loss, fluid loss refers to loss of base fluid to formations where a filter cake is formed or where solids cannot pass, i.e. where only the base fluid is lost. Properties that can be controlled in regard to fluid loss are the amount of filtrate and the thickness of the filter cake created, for example, by adding various polymers or desirable fine solids to the drilling fluid.

When programming a well to be drilled with hydrocarbons, seepage losses are usually estimated based on the size of the hole in millimeters over a 100 meter hole section. An example of this would be as follows: 200 mm hole section 3-4 $m^3$ of losses per 100 meters of new hole drilled, 222 mm hole section 4-6 $m^3$ of losses per 100 meters of new hole drilled, 311 mm hole sections >6 $m^3$ of losses per 100 meter of new hole drilled.

Seepage losses can be reduced, by varying amounts, by adding foreign solids to the fluid. The method is to plug or build a mat of material in, on, or near the well bore to seal off seepage losses between the drilling fluid and underground formations. Various products have been added to drilling fluids over the years in an attempt to control or prevent seepage losses or fluid losses to underground formations. These additives are commonly referred to as lost circulation materials. Known lost circulation materials include sawdust, gilsonite, asphalt, plastics, water soluble polymers and various thickening and gelling agents. Lost circulation materials are often ground or blended to different particle sizes based on the expected severity of lost circulation, and are intended to either plug loss zones with solids or polymers or to build up a mat to seal off the loss zone or reduce lost circulation at the loss zone.

Lost circulation materials traditionally used in attempts to control seepage losses include gilsonite, fibrous materials and calcium carbonate. However, agents such as these have not proven satisfactory.

These lost circulation materials, including known seepage loss agents, can have a variety of undesirable effects on drilling operations, including permanently damaging or plugging the oil or gas bearing formation, damaging the drilling fluid itself, and causing difficulties in maintaining the chemical or physical properties of the original drilling fluid. Additives that dissolve in the drilling fluid can alter the properties of the original fluid, such as lubricity and viscosity, which must then be corrected by additional measures. The use of additives can also cause mechanical problems in the drilling rig equipment, most notably, the fluid pumps and solids control equipment, such as shakers, screens, and centrifuges.

Some undesirable effects from solids that can affect the well bore and the drilling fluid properties, include: solids added to a hydrocarbon and water emulsion reduce the electrical stability or the emulsion stability of the drilling fluid by consuming emulsifiers and must be offset with the addition of emulsifiers to maintain the desired fluid properties; calcium carbonates with a density of 2600 kg/m$^3$ create higher densities in the hydrocarbon drilling fluid which can increase the rate of losses; oil wetting chemicals must be added to ensure the solids are oil wet; slower rates of penetration from additional solids and higher plastic viscosities of the drilling fluid; and erosion of the deposited solids with movement of the drill string and the annular velocity of the fluid pumping action.

U.S. Pat. No. 3,455,390, assigned to Union Oil Corporation of California, discloses a method of treating a well with a water-based well treating fluid to temporarily seal off a drilled well bore without permanent loss of permeability. Finely-divided (i.e. 1 to 50 micron) oil-soluble wax particles are dispersed in the aqueous treatment fluid, which is then pumped into the drilled well to seal off the bore until the well is returned to production. The fine wax particles dissolve within 24 to 48 hours in the hydrocarbon present at oil bearing zones of the formation to allow the well to return to production. Surface active agents and emulsifiers are added to the water-based treatment fluid to aid in dispersion and control particle size. There are a number of disadvantages associated with using such a fluid.

The presence of dissolved wax, surface active agents, emulsifiers and various dissolved polymers alters the original properties of the treatment fluid and renders the fluid expensive to manufacture and maintain and thus impractical for large scale use. The fluid loss agents taught in U.S. Pat. No. 3,455,390 are not suitable for drilling with oil based drilling fluids, since they would dissolve in the hydrocarbon over a short time, contaminating the drilling fluid and potentially the oil bearing formation itself. The fine wax particles described therein would not be effective in preventing seepage losses to porous underground formations during open hole drilling but rather are more suitable for very tight formations. The use of such finely divided particles renders the fluid ineffective for controlling seepage losses. The use of fine oil-soluble particles renders the treatment fluid ineffective for preventing seepage losses, particularly when using a hydrocarbon based drilling mud.

U.S. Pat. Nos. 3,302,719, 3,593,794, 3,601,194, 3,630,280, and 3,684,012, also assigned to Union Oil Corporation of California, disclose similar treatment fluids comprising various combinations of fine wax, resins, polymers, copolymers, surface active agents and emulsifiers for temporarily sealing off an underground formation surrounding a drilled well bore. These fluids have the same disadvantages as set out above and are not suitable for controlling seepage losses to porous formations, particularly when using hydrocarbon based drilling muds.

Lost circulation of drilling fluid, particularly seepage loss, is one of the most serious and expensive problems facing the drilling industry today. It is, therefore, desirable to provide improved seepage loss agents, improved drilling fluids and improved methods for reducing seepage losses to underground formations during drilling operations. An improved drilling fluid and method of using same should be effective but should also be simple and economical in manufacture and use. It should also minimize damage to the formation, the drilling fluid, and the drilling equipment.

SUMMARY OF THE INVENTION

The present invention is directed to a seepage loss agent for drilling fluids for reducing or controlling lost circulation to a subterranean formation. It is also directed to a drilling fluid comprising the seepage loss agent. A method of drilling a well bore using the drilling fluid of the invention is also provided.

In one aspect, the present invention provides a seepage loss agent for drilling fluid, the seepage loss agent comprising wax or waxy substance, which may be natural or synthetic wax. The drilling fluid may contain any commonly used base fluid, such as a hydrocarbon or aqueous based fluid or it may be an emulsion.

In another aspect, the present invention is directed to a method of reducing or preventing lost circulation of drilling fluid to a subterranean formation in a process of drilling a well. The method comprises adding wax or waxy substance to the drilling fluid as a primary seepage loss agent. It is added to the drilling fluid before and/or during drilling.

Other aspects and features of the present invention will become apparent to those ordinarily skilled in the art upon review of the following description of specific embodiments of the invention in conjunction with the accompanying figures.

BRIEF DESCRIPTION OF THE FIGURES

FIG. 3A shows the wax particles prior to any pressure or heat being applied; FIG. 3B shows pressure and heat being applied to the particles; FIG. 3C shows the blocking effect of the paraffin particles in response to pressure and heat; and FIG. 3D shows the blocked particles sticking to the surface after the unblocked particles have been removed.

DETAILED DESCRIPTION

Figure 1:
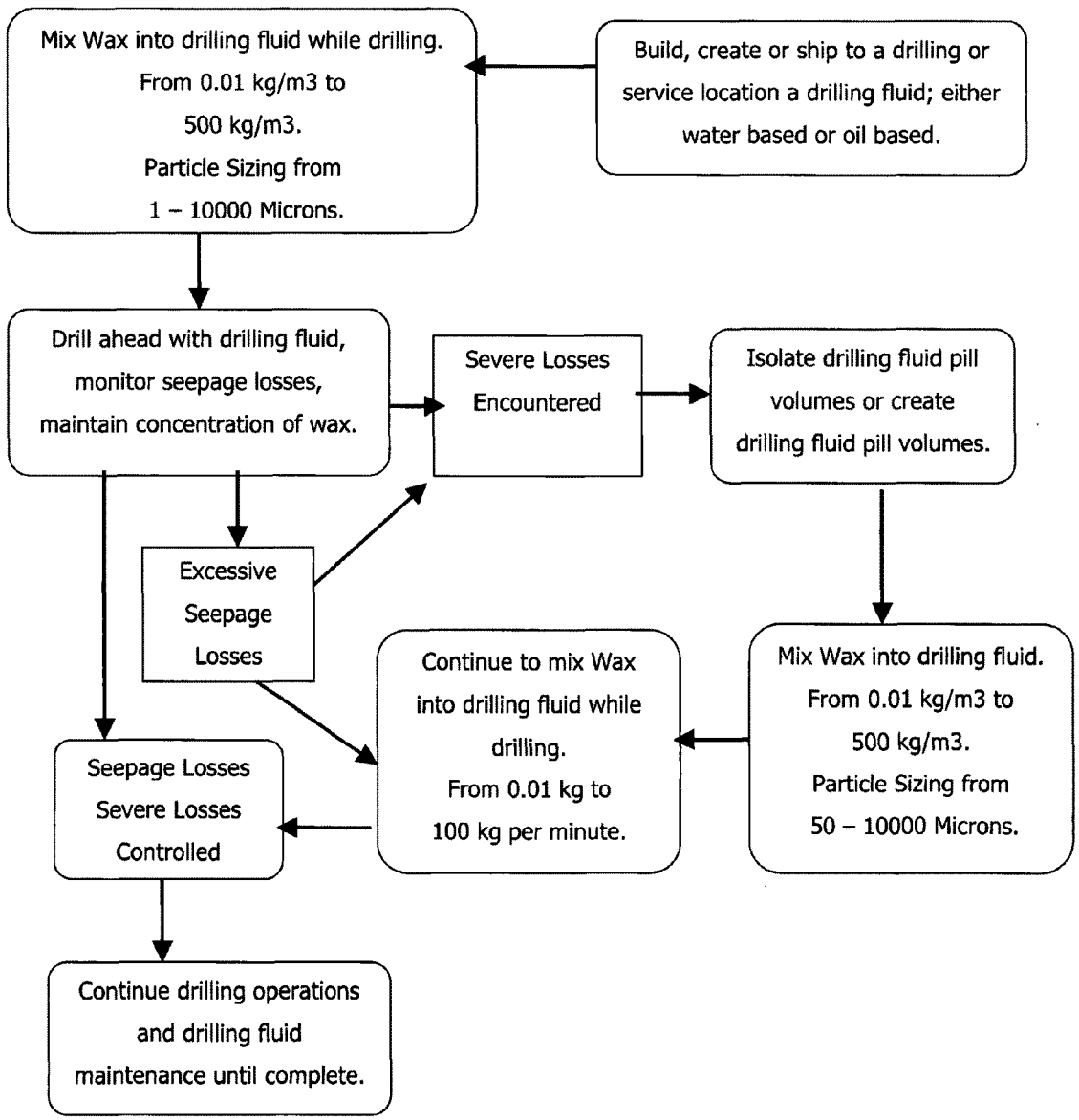
FIG. 1 illustrates one embodiment of a method of drilling a well, in accordance with an aspect of the present invention.

The major component of drilling fluid is its base fluid. Most drilling fluids are aqueous based, hydrocarbon based, or emulsions. Aqueous or water based drilling fluids are used for most drilling operations. However, for certain formations, drilling with water based drilling fluids can be problematic due to well bore instability caused by the swelling of water-absorbing rock and clay in the formation. Problems of this type can be greatly alleviated by using mud suspended in an oil base rather than water. Oil based drilling fluids tend to provide better lubrication and achieve significant increases in drilling progress. Of course, aqueous based drilling fluids provide an economic advantage. Although oil based drilling fluids are more costly than aqueous based fluids, they are generally preferred for deep drilling, high temperature drilling or when a substantially non-reactive base fluid is required for a particular drilling operation or subterranean formation. The drilling fluid may also be an emulsion, such as an oil-in-water emulsion or a water-in-oil ("invert") emulsion. Where an emulsion is used, an invert drilling fluid is preferred.

The drilling fluid may be a well kill fluid. A well kill fluid is a drilling fluid with a density great enough to produce a hydrostatic pressure to substantially shut off flow into a well from an underground formation, for example, comprising regular drilling fluid weighted up with barite, hematite or other solids.

Although any common base fluid may be used in accordance with the present invention, the preferred base fluid is a hydrocarbon based drilling fluid or an invert emulsion.

The seepage loss agent of the present invention is wax or a waxy substance. It may be refined, unrefined, or semi-refined. The wax or wax blend does not need to be high-grade. It is mixed or added into the drilling fluid as a primary seepage loss agent and is preferably the only seepage loss agent in the drilling fluid. The seepage loss agent is preferably dispersed in the drilling fluid without the need for stabilizers, surface active agents or emulsifiers, which can negatively impact both the drilling fluid and the drilling process. For example, the presence of complex surfactants, as disclosed in U.S. Pat. No. 3,455,390, could cause the drilling fluid to fail microtoxicity testing and render the fluid ineligible for full disposal. It has now surprisingly been found that viscosifying the drilling fluid, for example with polymers or gels, enhances dispersion of the wax particles in the base fluid, further negating the need for surface active agents or emulsifiers.

The term wax or waxy substance describes any of a variety of natural or synthetic, oily or greasy, heat-sensitive substances, consisting of, for example, hydrocarbons or esters of fatty acids that are insoluble in water. Waxes are generally hydrophobic or water-repelling. Many waxes are soluble in non-polar organic solvents, such as hydrocarbon, although the degree of solubility varies between waxes. Individual wax properties are determined by molecular size and structure, chemical composition and oil content. Physical properties that can be measured include melt and congealing points, drop melt point, hardness (needle penetration), oil content (indicates degree of refining), kinematic viscosity and color. Oil content affects the solubility of a wax in an organic solvent. Odor and other properties can also be assessed. A combination of physical properties and functional properties, such as flexibility and blocking ability, determines whether a particular wax is suitable for a given application.

Natural waxes include waxes derived from animal, vegetable and mineral sources. Animal waxes include, but are not limited to, beeswax, lanolin, lanocerin, and shellac waxes. Vegetable waxes include, but are not limited to, carnauba, candellila, jojoba, flax, sugarcane and ouricouri waxes. Mineral waxes include petroleum waxes and earth or fossil waxes, which include, but are not limited to, paraffin, petrolatum, microcrystalline, semi-microcrystalline, intermediate, ozocerite, ceresine and montan waxes. Montan waxes can be refined from such sources as lignite, humalite or brown coal.

Synthetic waxes are man-made waxes and may be derived from such source as hydrocarbon, alcohol, glycol, and/or esters. They include, but are not limited to, polypropylene (PP), polyethylene (PE), high density polyethylene (HDPE), polytetrafluoroethylene (PTFE), Fischer-Tropsch™, fatty acid amine, chlorinated and other chemically modified hydrocarbon waxes and polyamide waxes.

The seepage loss agent may be a raw wax, a slack wax or a scale wax. Slack wax typically refers to petroleum wax containing anywhere from about 3% to about 15% oil content. Scale wax typically refers to wax containing about 1% to about 3% oil.

A waxy substance is any suitable non-wax substance with wax-like properties. This would include, for example, various synthetic waxes and polymers, such as polyolefins.

Selection of an appropriate wax or waxy substance for use as a seepage loss agent in accordance with the present invention will depend on a number of factors, including the base fluid, the structure and porosity of the underground formation, and the bottom hole temperature, among others. A person skilled in the art, once armed with the teachings herein, can select the appropriate wax or waxy substance to be used in a particular drilling operation to reduce, control or prevent seepage losses during drilling.

In a preferred embodiment, the seepage loss agent is a paraffin wax. Paraffin wax is a natural product that consists mostly of straight chain hydrocarbons, typically in about the $C_{20}$ to $C_{35}$ range. The balance consists of branched paraffins and cycloparaffins. Paraffin wax is generally non-reactive, non-toxic and clean-burning with good water barrier properties. Paraffin waxes are characterized by a clearly defined crystal structure and have the tendency to be somewhat hard. The melt point of paraffin waxes is generally between about 43° C. and about 80° C. (about 100° F. to about 176° F.).

The paraffin wax suitable for use in accordance with the present invention may be unrefined, semi-refined (about 0.5 to about 1% oil content) or refined (less than about 0.5% oil content) paraffin wax. Preferably, the wax is a refined paraffin wax that is substantially insoluble in hydrocarbon-based drilling fluid without the assistance of temperature. By substantially insoluble, it is meant that less than about 30%, preferably less than about 15%, more preferably less than about 10%, most preferably less than about 5%, of the seepage loss agent will dissolve in the drilling fluid during the course of the drilling procedure.

It has been found that found that smaller particles tend to have higher rates of dissolution in base oil than larger particles. Particles that are considered too small for use in accordance with the present invention include wax particles of less than about 50 microns, which would be ineffective for controlling seepage losses and which would tend to dissolve in the base oil over a short time. It has further been found that different waxes have different dissolution rates in base oil and dissolution rates of newly added wax particles are mitigated in base oil that was previously exposed to wax, or so-called "saturated" base oil.

Example 2 demonstrates the substantial insolubility of refined paraffin wax in hydrocarbon over time. Even at the latest timepoint measured, the bulk of the wax remains dispersed rather than dissolved in the hydrocarbon with a small amount localized in a particle cloud above the sample. This is due in part to the size of the particles. Larger particles tend to remain in the solid state whereas very fine wax particles tend to dissolve over time in the base oil.

Example 5 demonstrates the dissolution of wax in base oil that is rolled for 60 hours at ambient temperature. It was demonstrated that larger wax particles (i.e. 1000-4000 microns) have lower rates of dissolution than smaller particles (i.e. 500 microns) and that microcrystalline wax has a lower rate of dissolution than paraffin wax at the same particle size.

Example 6 demonstrates the decrease in dissolution rate when new wax is added to base oil that was previously exposed to the wax, or a so-called "saturated" base oil. Thus, the dissolution rate of wax that is added to recycled base oil or invert will be diminished due to the presence of finely dispersed wax particles, or even minor amounts of dissolved wax, in the recycled fluid.

The primary seepage loss agent may comprise particles of uniform or varying size. Preferably, the primary seepage loss agent is a blend comprising particles of different sizes. A blend ensures that larger particles are available for plugging or bridging larger permeations in the formation while smaller particles are available for penetrating smaller permeations.

Particle sizes may range from above 50 microns to about 20,000 microns, preferably from about 100 microns to about 10,000 microns, more preferably from about 100 microns to about 5000 microns, more preferably from about 500 microns to about 4000 microns. As a skilled person will appreciate, smaller particles (ex. 500 to 1500 microns) can be used for controlling seepage losses whereas larger particles (ex. 3000 to 5000 microns, or larger) would be more effective for controlling more severe losses.

Figure 2:
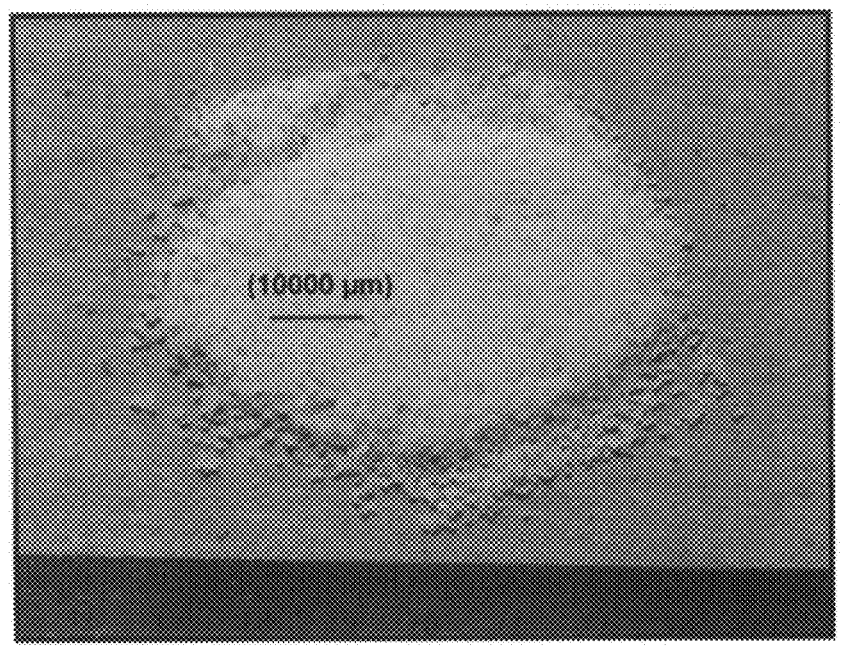
FIGS. 2A and 2B show refined paraffin wax of two different particle sizes for use as a seepage loss agent in accordance with an aspect of the present invention.
Figure 2:
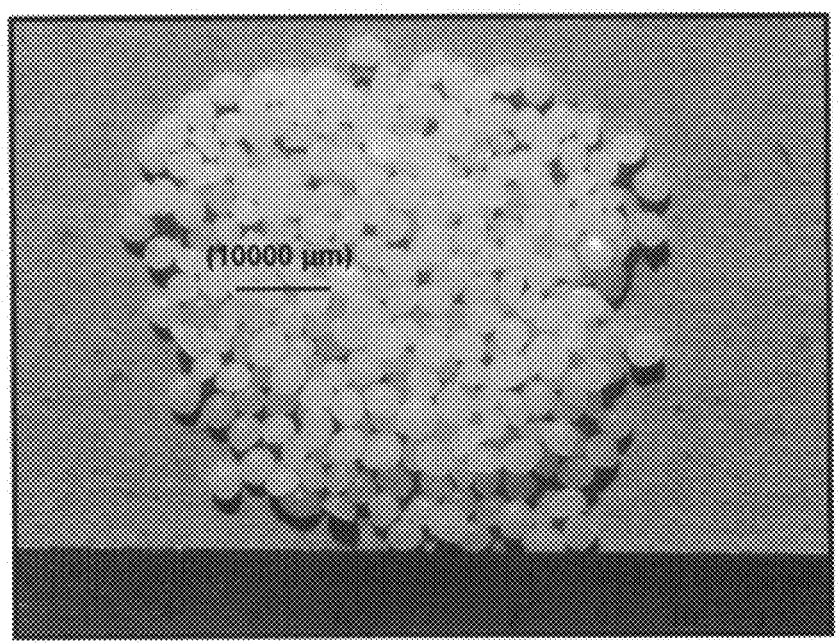

FIG. 2A shows a sample of medium paraffin wax particles in approximately the 800 to 1200 micron range and FIG. 2B shows coarser wax particles in approximately the 3000 to 4000 micron range.

In defining an appropriate particle size range for use in controlling lost circulation, any lower limit (ex. 50, 100, 300, 500, etc., microns) may be combined with any upper limit (ex. 1000, 5000, 10000, 20000, etc., microns) in accordance with the present invention.

It is preferred that particles are greater than 50 microns in size. With particle sizes below 50 microns, it becomes more difficult to produce and stabilize the wax particles in the drilling fluid without the use of additional agents, such as surface active agents and emulsifiers. Furthermore, particles of less than 50 microns are ineffective in preventing seepage losses to a porous underground formation during drilling. Smaller particles are better suited for very tight formations or as a filter cake additive for controlling fluid loss.

It is preferred that all or a majority (i.e. 50% or greater) of the wax particles are in the preferred particle size range.

The drilling fluid of the present invention may comprise a blend of a variety of different waxes or waxy substances of uniform or non-uniform particle size. In one embodiment, the seepage loss agent is a blend of paraffin and microcrystalline waxes, where the microcrystalline particles are larger than the paraffin particles, to increase the retention numbers and lower the solubility of the smaller paraffin particles in the base oil, particularly in a fresh base oil not previously exposed to the seepage loss agent.

The porosity and permeability of an underground formation, as well as microfractures in a substantially non-permeable formation, should also be considered when selecting an appropriate particle size range and effective seepage loss agent. Porosity can be measured in microns and permeability can be measured in darcys. A darcy is a measure of flow through a channel and provides a connection to porosity in a formation. Seepage losses are experienced in porous formations having a permeability of greater than about 300 darcys and in fractured formations. Fractures have a wide range of sizes, for example, from 100 microns in diameter to very large cracks.

During drilling, a constant flow of whole mud into a formation is commonly experienced. The formations to which whole mud can be lost include, but are not limited to: cavernous and open-fissured formations, very coarse and permeable shallow formations such as loose gravel, natural or intrinsic fractured formations and easily fractured formations. In selecting an appropriate seepage loss agent, consider the ratio of the size of the particles in the drilling fluid to the pore size of the rock being drilled. Generally speaking, when the ratio of particle size to pore size is less than about 1/3, whole mud will pass through the formation, bridging will not occur, and seepage or total losses will be experienced. For example, if the pore size of a formation is 90 microns and the particle size is only 25 microns, whole mud loss will occur.

Field testing with different sized wax particles indicates that larger particles are more effective than smaller particles in controlling seepage and total losses to porous formations. Thus, bridging agents in the range of, for example, 500-1500 microns, are more effective for seepage loss control than the small particles required for good fluid loss control, which are, for example, in the 1 to 20 micron range. The fluid loss particles are simply too small for bridging under drilling conditions where whole mud is being lost. Large particles, for example, 4000 to 5000 microns, are more effective for controlling severe losses.

A Permeability Plugging Test (PPT), which is a modified HTHP test, can be used to determine if a given particle would be better suited as a fluid loss particle or a seepage loss particle.

In accordance with the present invention, the seepage loss agent is preferably in a solid form. It is preferred that substantially all of the seepage loss agent stay in the solid state throughout the drilling procedure. Preferably, the seepage loss agent is substantially insoluble in aqueous based and hydrocarbon based drilling fluid at ambient temperatures, such that only a small amount of the seepage loss agent will actually dissolve in the drilling fluid at the temperatures experienced during a typical drilling operation. Example 2 demonstrates the substantial insolubility of refined paraffin wax particles in four different base oils.

Several problems can occur if a substantial amount (i.e. greater than 30%) of the seepage loss agent dissolves in the drilling fluid during the drilling operation, for example, dissolved wax in the drilling fluid can alter the physical and chemical properties of the drilling fluid itself, which can negatively impact the drilling process. Furthermore, too much wax in solution could potentially contaminate the oil bearing formation.

The melt point, or melting temperature, of a particular wax or waxy substance is thus an important consideration in selecting an appropriate substance or blend of substances for the seepage loss agent. During drilling, the temperature in the well increases as the well deepens or as the permeability of the formation decreases. Thus, the wax used as the seepage loss agent is selected such that it remains in its solid form during substantially the entire drilling process.

A typical bottom hole temperature in Western Canada is estimated to be about 55° C. to about 90° C., generally about 65° C. Temperatures at the surface are generally about 15° C. lower, thus about 40° C. For a typical drilling operation, the seepage loss agent may thus be selected such that it has a melt point above about 40° C., preferably above about 65° C. Preferably, the melt point of the seepage loss agent is greater than the expected operational temperatures encountered during drilling, i.e. the temperatures of the circulating drilling fluid, the flowlines, the drilling equipment and the developing well bore, such that the seepage loss agent stays substantially solid during the drilling operation. The melt point of the wax may be somewhat lower than the warmest temperatures experienced inside the formation however, thus a portion of the wax may melt over time as a portion of the drilling fluid seeps or flows out of the well bore and into the formation.

Preferably, the melt point of the seepage loss agent is at least about 10° C. higher than the highest operational temperature expected during drilling.

Preferred waxes and waxy substances for use in accordance with the present invention have melt points in the range of from about 10° C. to about 140° C. More preferred melt point ranges are from about 40° C. to about 140° C., and even more preferably from about 65° C. to about 85° C. Although there is no absolute upper limit for the melt point of the seepage loss agent, other properties of the wax or waxy substance, such as hardness, are affected as the melt point increases. These additional factors can make the wax unsuitable for use in drilling fluids.

The primary seepage loss agent may comprise a blend of different waxes and/or waxy substances having different melt points. Such a blend can be manufactured by those of skill in the art and tailored to a particular drilling operation. The various waxes can be selected based on melt point depending on, for example, the anticipated bottom hole temperature.

The seepage loss agent is combined with the drilling fluid such that the drilling fluid contains from about 0.01 kg/m$^3$ to about 500 kg/m$^3$ of the seepage loss agent. In referring to the concentration, the volume may be measured before the seepage loss agent is added, for example, about 0.01 kg to about 500 kg of wax may be added to 1 m$^3$ of drilling fluid. The amount of seepage loss agent added to the fluid, and the rate at which it is added, will depend on expected or "real-time" seepage losses at a particular formation. It is considered well within the ability of a person skilled in the art to select an appropriate concentration of seepage loss agent and a suitable addition regimen for a given drilling operation and formation.

For control of moderate seepage losses, for example, the preferred concentration of primary seepage loss agent may range from about 1 kg/m$^3$ to about 200 kg/m$^3$, more preferably from about 1 kg/m$^3$ to about 100 kg/m$^3$, more preferably from about 1 kg/m$^3$ to about 50 kg/m$^3$, more preferably from about 5 kg/m$^3$ to about 20 kg/m$^3$. A primary seepage loss agent concentration of less than 50 kg/m$^3$ is particularly preferred for controlling seepage losses, since there will be minimal effect on the drilling fluid or the drilling operation.

The primary seepage loss agent in the drilling fluid forms at least a partial barrier to prevent lost circulation into the underground formation. Preferably, it forms a semi-permeable or impermeable layer on the wall of the well bore, by plugging permeations at a loss zone, or by forming a semi-permeable or impermeable layer or mat to at least partially seal off a loss zone. The at least partial barrier may be hydrophobic. The barrier may reduce hole instability caused by the hydration of clays and clay type solids in the underground formation due to lost circulation when drilling with an aqueous based fluid. The barrier may also reduce contamination of the oil-bearing formation. Alternatively, the primary seepage loss agent forms clumps, chunks or blocks in or on the underground formation to reduce or prevent lost circulation.

Figure 3:
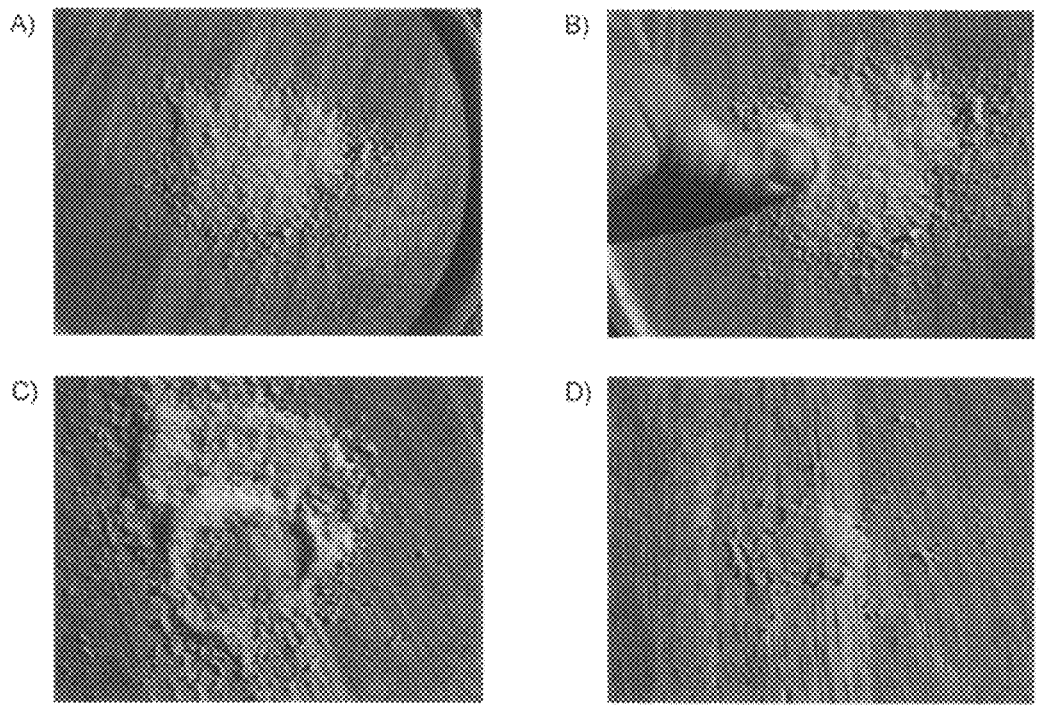
FIGS. 3A to 3D illustrate "blocking" of paraffin wax particles having a particle size of about 800 to 1200 microns.

The primary seepage loss agent preferably exhibits a blocking effect, for example, as illustrated in FIG. 3. Blocking refers to the effect of wax particles joining or forming together into layers, stacks, chunks, blocks or formations and is determined by the properties of the wax or waxy substance. Blocking may be encouraged by heat, momentum, or pressure generated during the drilling process and blocking provides improved control of lost circulation.

FIGS. 3A to 3D illustrate the blocking effect of a refined paraffin wax having a medium particle size (ex. about 800 to about 1200 microns). FIG. 3A shows the wax particles prior to any pressure or heat being applied. FIG. 3B shows pressure and heat being applied to the wax particles. FIG. 3C shows the blocking effect of the paraffin particles in response to pressure and heat. FIG. 3D shows the blocked particles sticking to the surface after the unblocked particles have been removed. This blocking effect illustrates how blocked wax particles will form a layer that can act on or near the bore wall to reduce seepage losses to the formation. This layer can also provide additional hole stability in fractures or coal seams.

The malleability or deformability of the seepage loss agent plays an important role in determining its blocking ability. A wax that is too hard or brittle will exhibit poor blocking ability and therefore may not form an effective layer on or in the formation for reducing or preventing lost circulation. Generally, waxes with higher melting temperatures have a higher degree of hardness and therefore exhibit poorer blocking. It is therefore important to select a wax that has a suitable hardness to allow it to form the barrier layer but a high enough melting temperature to allow it to stay in a substantially solid form in the drilling fluid.

The tackiness of a given wax or waxy substance is another factor to consider in selecting a suitable seepage loss agent for use in accordance with the present invention. Waxes with lower coefficients of friction are preferred since they are less likely to interfere with drilling operations or damage drilling equipment. Substances with lower coefficients of friction are noteworthy because of the enhanced value to a drilling operation due to lower torque and drag issues when the drill pipe is in the hole. This is especially important in directional or horizontal drilling. A preferred seepage loss agent will have minimal effects on both the mud and the drilling operation. A preferred seepage loss agent is one which exhibits minimal interference with solids control or with directional drilling equipment, which is vital to many drilling operations. Many known products currently added to fluids in an effort to control seepage losses interfere with the equipment, causing fluid and operational problems.

Selection of a suitable seepage loss agent, or construction of a suitable blend, is thus based on a balance of all the characteristics of the wax or waxy substance, as well as the structure of the formation being drilled, along with cost considerations and availability.

The drilling fluid with the primary seepage loss agent may optionally include one or more secondary seepage loss agents. Such secondary seepage loss agents may include previously known seepage loss agents, such as organic fibers, sawdusts, gilsonite, asphalt, cellophane, plastics, calcium carbonate, sulfonated asphalt, sulfonated gilsonite or combinations of any of these materials.

The drilling fluid may optionally include one or more additives or inhibitors commonly used in the industry. Additives for drilling fluids fall into several basic groups. They include, but are not limited to: viscosifiers, such as Bentone™ 150 or Baragel™ 3000 (organically modified bentonite clay); weighting agents, such as barite or calcium carbonate; surface active agents; emulsifiers, i.e. a "primary" oil mud emulsifier such as a blend of stabilized fatty acids in liquid form, that reacts with Lime to form a soap-based emulsifier, a "secondary" oil mud emulsifier such as a sulfonated amino amine, blended with wetting agents to be used as a co-emulsifier; oil wetters; alkalinity control additives; fluid loss reducers, such as Drispac™ Poly-anionic Cellulose (PAC) or Drillstar™—Yellow (fluid loss reducers generally fall in the 1-10 micron range); thinners or dispersants; flocculants; defoamers; lubricants; shale inhibitors, such as calcium chloride or amines; and corrosion inhibitors.

Potential advantages of using wax or waxy substance as a seepage loss agent in accordance with the present invention, include, but are not limited to: non-toxic, biodegradable with no handling or exposure issues, low density, no oil wetting agents are required for wax additions, little to no effect on emulsion or electrical stability, low coefficient of friction thus lowering hole torque and drag, non-damaging and removable, and available in a wide range of melt points and particle sizing for optimum performance.

The seepage loss agent of the present invention may be used with a variety of industry recognized mud systems, examples of which include: (1) inverts, which are hydrocarbon based and require complete offsite disposal of cuttings and reconditioning of the mud system, which is very costly but effective in highly unstable well bores; (2) potassium chloride or potassium sulfate systems, which are water based systems that provide effective shale inhibition via ion exchange in the shales—costly and require costly disposal of not only the cuttings but also the system due to high chloride content; (3) silicate systems, which are water based—effective but require costly disposal of solids and have other associated problems; (4) amine systems, which are water based and fairly effective compared to KCl systems, however are fully disposable on the drilling site or surrounding land, so are more cost effective than the KCl systems; (5) PHPA or polyacrylamide systems, which are more of an encapsulation type of inhibition for shales and are fully disposable; and (5) normal water based systems—no inhibitors just bentonite & polymers, fully disposable. Each type of system has its own advantages and drawbacks, as will be appreciated by the person skilled in the art.

Method of Treating a Subterranean Formation

The present invention also relates to a method for treating a subterranean formation and, in particular, to a method of drilling a well to reduce, control or prevent lost circulation of the drilling fluid to the formation. FIG. 1 is a flow diagram illustrating an embodiment of the method of the present invention. The general method involves using a drilling fluid and a primary seepage loss agent, as described herein, in a drilling procedure to reduce, control or prevent seepage losses during the drilling procedure.

The method may be either a preventive method or a treatment method, or a combination of both. In a treatment method, the seepage loss agent is typically added to the drilling fluid during drilling. Alternatively, it can be added to the drilling fluid prior to drilling as a preventive measure. This is especially useful in cases where the amount of lost circulation is anticipated prior to drilling such that the seepage loss agent may be added in a single addition prior to drilling.

Typically, an initial volume of seepage loss agent is added to the fluid prior to drilling and then additional volumes are added throughout drilling, as needed. The concentration of seepage loss agent in the drilling fluid is adjusted throughout the procedure to account for any sudden changes in lost circulation that are experienced.

In the event of anticipated or "real-time" severe seepage losses, pill volumes of the seepage loss agent are added to the drilling fluid to reduce lost circulation. A pill volume is a discrete high concentration of seepage loss agent added to a drilling fluid to prevent or reduce severe seepage losses to a formation. Pill volumes of the seepage loss agent are added to at least partially seal or occlude the loss zone with wax or waxy solids to improve or correct the lost circulation of drilling fluid to the underground formation.

In one embodiment, for seepage control, wax is continually mixed into the drilling fluid. Higher volumes of primary seepage loss agent or higher rates of addition are needed to control larger seepage losses. The rate and route of addition can be adjusted throughout the drilling procedure to account for changes in lost circulation anticipated or encountered throughout the procedure.

The primary seepage loss agent can reduce damage to drilling rig equipment since the wax or waxy substance will form a protective layer on it. The seepage loss agent can also act as a lubricant thereby reducing wear. This will help to control costs associated with maintenance and repair of the drilling equipment.

The primary seepage loss agent may be mixed directly into the active circulating drilling fluid at a rate of about 0.01 kg to about 100 kg per minute while drilling ahead. Alternatively, the primary seepage loss agent may be mixed into a holding tank or premix tank containing drilling fluid in a concentration range from about 0.01 kg/m$^3$ to about 500 kg/m$^3$ (kg wax/m$^3$ drilling fluid pre-addition). The drilling fluid can be spotted into a particular place in the hole if needed, i.e. a loss zone, or circulated into the hole through the circulating system. By spotted, it is generally meant that the drilling fluid is delivered directly to a desired area of the well bore or formation, preferably at or near a loss zone.

The following Examples are not intended to limit the invention in any way.

EXAMPLE 1

HPHT Testing of Lost Circulation Agents

According to industry standards and customs, an effective lost circulation agent should provide reduced displacement of fluid and hold pressure for at least about 30 minutes in an HPHT test.

Samples of 250 ml of Distillate 822™, a common base oil, were each tested in the HPHT Test with an addition of 10 kg/m$^3$ of a common lost circulation agent or shaved and powdered paraffin wax. The common lost circulation agents tested included Ultraseal™, FiberFluid™, gilsonite, and Easyseal™. Each 250 ml sample of base oil with the above common lost circulation agents was displaced to the filtrate in less than 30 seconds in the HPHT test. Each 250 ml sample of base oil with the powdered wax provided displacement of less than 50 ml (i.e. less than 20%) and the sample held pressure for at least 30 minutes, thereby exceeding industry standards.

EXAMPLE 2

Substantial Insolubility of Refined Paraffin Wax in Base Oil

Samples of refined paraffin wax were dispersed in 4 types of base oil: HT™ 40N, Distillate™ 822, Drillsol™ and Cutter™ D. The amount of dissolved wax, if any, was assessed at various timepoints to determine the solubility of the refined wax particles in various base oils.

After 7 days, a negligible amount of the wax was dispersed and floating in a particle cloud above the sample from original particles with no obvious indication of dissolved wax. After 30 days, a bit more was dispersed and in a particle cloud. After 45 days, results were about the same as for 30 days. No change was noted with increased agitation of the samples.

The above suggests that the refined paraffin wax tested is substantially insoluble in base oil over a period long enough to permit completion of a drilling procedure.

The test performed was a static sample test and showed the potential for saturating the fluid wherein only a small portion of wax went into solution and then stopped.

Although the refined paraffin wax used in this experiment is generally considered by persons skilled in the art to be "insoluble" in base oil, it should be noted that refined paraffin waxes may be rendered temporarily soluble in base fluid if the temperature exceeds the melting point, wherein the paraffin wax is turned into a liquid. The hydrocarbons are then miscible while hot. If the temperature of the base oil is cool, i.e. below the melting point of the wax, and the quantity of paraffin is not too high, there is little to no effect on the properties of the base oil. As the quantity of paraffin increases that is blended together at high temperature, when cooled the hydrocarbon will start to thicken or if increased high enough will congeal to a solid type structure. Thus, it is preferred that the melting point of the wax is higher than the operational temperatures experienced during drilling.

EXAMPLE 3

Field Testing of Invert Drilling Fluid Comprising Refined Parrafin Wax

Wells were drilled using traditional seepage loss agents and seepage losses were recorded. Test wells were drilled using refined paraffin wax as a seepage loss agent in accordance with an embodiment of the present invention and seepage losses were recorded.

All wells were drilled in Alberta, Canada, by a single operator. All were drilled to substantially the same depth, encountering the same or similar drilling conditions with respect to production zones and formations drilled from surface to total depth for a total of about 90 drilling locations or completed wells.

All of the comparison wells had the same fluid treatment and were run in the same manner. Ten to twelve wells were drilled with refined paraffin wax additions in accordance with an embodiment of the present invention. The wax additions were mixed while drilling ahead at a concentration of about 68-90 kg of wax into 120 $m^3$ drilling fluid system (Invert) per 100 meters of new hole drilled. The mixing ratio used was 1:1:1 for particle sizing. The particle size was alternated using the 1:1:1 ratio and the 3 sizes tested: 300-500 micron, 800-1200 micron, and the 3000-4000 micron. The only fluid difference of note between the comparison and test wells was the addition of wax in the test wells and reduction of the other standard seepage loss materials like gilsonite and Fiber-Fluid™ by about 80% less of each.

The field test data presented below (Table 1) shows the seepage losses encountered when drilling a well by a traditional method compared to an embodiment of the method of the invention. Data for 6 test wells is provided. The first value in each column shows the average seepage losses ($m^3$) for the 7 or 8 wells geographically closest to a test well drilled in accordance with an aspect of the present invention, i.e. with wax added as the primary seepage loss agent. The second value shows the average losses ($m^3$) of the 3 or 4 geographically closest wells. The third value represents the losses ($m^3$) reported for the test well drilled in accordance with an aspect of the present invention.

TABLE 1

Field Test Data - Whole Mud Losses ($m^3$)

| | Tests | | | | | |
|---|---|---|---|---|---|---|
| | 1 | 2 | 3 | 4 | 5 | 6 |
| Avg. losses 7-8 closest wells | 98 | 102 | 83.5 | 83.5 | 83.5 | 102 |
| Avg. losses 3-4 closest wells | 108 | 90 | 79 | 86.8 | 119 | 90 |
| Test Well Losses | 61 | 65 | 53 | 65 | 54 | 71 |

Field testing shows approximately a 35% reduction in seepage losses for test wells as compared to locations running standard seepage loss control products. Field testing data is compared to averages of losses on offsetting locations and shows a marked improvement in seepage loss control. A loss reduction of about 35% results in significant cost savings for the operator. The transportation savings and reduced chemical consumption per location further adds to an overall operator cost reduction while drilling with hydrocarbons.

EXAMPLE 4

Field Testing of Water-Based Mud System Comprising Refined Paraffin Wax

Testing was performed in Alberta, Canada, a difficult area to drill due to severely unstable coal zones, unconsolidated formations and hydratable shales that slough into the well bore. In a typical operation in this area, a water based silicate mud system is used due to severe shales in the upper hole. Surface casing is set to a normal depth of about 300 meters using normal water based fluid. Using silicate fluids, operators then drill down to about 2000 meters to run the next string of casing, the Intermediate casing string, which is put in place to hold back the well in this area and is a costly part of the well program. This is a difficult section of the developing hole due to large coal seams and severe losses to the formation and the hydratable shales. It is very pricey to maintain the silicate levels in the fluid and fight losses at the same time to control and prevent the hole from sloughing in. Operators must fight down to the 2000 meter mark and run the Intermediate casing. Then they drill out with the silicate fluid and drill ahead to a total depth of about 2600 meters and run the final casing string. Operators must then dispose of the silicate mud system and all the solids excavated from the well bore offsite at a landfill facility. These wells are programmed with an expectation of about 28 days from spudding to rig release.

The aim of the field test was to drill a well with a water based fluid utilizing a proprietary EnviroBond Amine system (Canadian Energy Services) supported by a refined paraffin seepage loss agent of the present invention. The seepage loss agent was used as a hydrophobic barrier to prevent shale hydration, stabilize the coal seams and in pill form to fight the seepage losses. The amine was used to inhibit any water that made it through the wax barrier. The objectives were to drill the upper hole, control losses, increase borehole stability, prevent the shales and coals from sloughing in, increase the well bore strength to hold the fluid density required to possibly drill to total depth, and avoid the Intermediate casing string if at all possible.

The test well was spudded and the normal surface hole was drilled with no problems. The upper hole was drilled out with the wax and amine system and the loss zones were drilled down to. The loss zones were then controlled and drilled through using drilling fluid containing the seepage loss agent without amine, with only moderate losses experienced, and the density was increased from 1030 kg/$m^3$ to 1145 kg/$m^3$ prior to reaching the Intermediate casing depth. The operators were able to drill through and past the Intermediate casing point to total depth. The hole was then conditioned and the casing run to total depth. The well was completed in 16 days.

In drilling the test well in accordance with an embodiment of the present invention, the operators successfully inhibited the upper hole, sealed off the loss zones, increased the well bore stability of the upper hole to support the much increased density, avoided the Intermediate Casing string altogether and completed the well in 16 days, a full 12 days under the expected AFE and drilling time and at a significantly lower operational cost. The mud cost itself was decreased and, as an added advantage, the mud system and cuttings were fully disposable. This was the fastest, deepest bit run in the area to date. It should be noted that the amine system was previously tested and did not provide significant advantages on its own.

EXAMPLE 5

Solubility of Different Seepage Loss Agents in Cold Rolling Base Oil

Cold Rolling Tests were performed to determine the relative solubility of different seepage loss agents in base oil. Wax was dispersed in Distillate 822 and rolled for 60 hours at ambient temperature. The percentage of material by weight that was recovered from the sample by gravimetric separation using VWR 413 filter paper (qualitative fast filtration) was recorded to determine how much of the wax was dissolved, or very finely dispersed, in the fluid after 60 hours. The initial tests indicated the following, in general summary form:

Sample 1: 500 Micron Paraffin Wax

The dissolution was fairly high with this material. The particles break down fairly fast and form particle clouds so gravimetric separation from the fluid phase was not feasible. These results are partially supported by field trials using the smaller particles, which show higher solubility in base oil than the larger particles. This particle size was used in field trials however with good results for seepage loss, the difference being that layers of material build up on the wall of the borehole during the drilling operation rather than just rolling the wax in a solution.

Sample 2: 4000 Micron Paraffin Wax

Same test as above with much lower dissolution in base oil, with 70.5% of material being recovered from the sample.

Sample 3: 1000 Micron Microcrystalline Wax

Same test as above with 91% recovery from the base oil.

Sample 4: 4000 Micron Microcrystalline Wax

Same test as above with >95% recovery from the base oil.

EXAMPLE 6

Solubility of Wax in "Saturated" Base Oil

The aim of the test was to determine if the solubility of wax in base oil previously exposed to wax, or so called "saturated" base oil, would be decreased. This is applicable since base oils and inverts are often recycled and reused during drilling operations. The base oil tested was Distillate 822.

In step 1, 29 g of refined paraffin wax was added to 300 g of Distillate 822 and rolled for 60 hours at ambient temperature. It was found that 29.5% of the wax was not recovered from the system, either due to solubility of the wax and/or the formation of smaller wax particles due to abrasion and dissolution/precipitation mechanisms. The Distillate 822 was filtered through VWR 413 filter paper (qualitative fast filtration) and 219.01 g of Distillate 822 filtrate was recovered. In step 2, 22.15 g of course paraffin wax was added to the 219.01 g Distillate 822 filtrate. This represents the same ratio of Wax: Distillate 822 as used in step 1. This combination was rolled for 60 hours at ambient temperature. In step 2, it was found that only 1.8% of the wax was not recovered from the system, either due to solubility of the wax and/or the formation of smaller wax particles due to abrasion and dissolution/precipitation mechanisms. This finding suggests that dissolution of wax in base oil is mitigated when the base oil becomes saturated with the wax.

Based on the above results, small wax particles in general appear to have higher dissolution rates in base oil than larger particles, different types of wax have different dissolution rates in base oil, and dissolution rates are lower in systems that have been previously exposed to wax, or so-called "saturated" systems. Thus, dissolution of newly added wax will be lower in recycled inverts and base oils that have been previously exposed to the seepage loss agent. It is preferable that substantially all of the seepage loss agent remain in the solid state in the drilling fluid during the drilling procedure.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A seepage loss agent for reducing or controlling seepage losses to a permeable underground formation during a process of drilling a well in an oil or gas recovery operation, the seepage loss agent consisting of:
    wax particles selected from the group consisting of natural wax particles, synthetic wax particles and a mixture of natural and synthetic wax particles, each of said wax particles having a particle size greater than 50 microns and being substantially insoluble in hydrocarbons at temperatures below melt point.

2. The seepage loss agent of claim 1, wherein the wax particles remain substantially solid during the drilling process.

3. The seepage loss agent of claim 2, wherein the melt point of the particles is above operational temperatures encountered during drilling.

4. The seepage loss agent of claim 3, wherein the melt point of the particles is below a temperature in the underground formation.

5. The seepage loss agent of claim 3, wherein the all or a majority of the particles are in the range of 100 microns to about 5000 microns.

6. The seepage loss agent of claim 3, wherein the particles comprise a mixture of particles of two or more different particle sizes.

7. The seepage loss agent of claim 3, which consists essentially of particles of refined mineral wax.

8. The seepage loss agent of claim 7, wherein the refined mineral wax is selected from the group consisting of paraffin waxes, microcrystalline waxes and mixtures thereof.

9. The seepage loss agent of claim 7, wherein the particles comprise a mixture of refined paraffin wax particles and refined microcrystalline wax particles, wherein the microcrystalline particles are larger than the paraffin particles.

10. The seepage loss agent of claim 2, wherein wax is selected such that the melt point of the particles is at least about 10° C. above the highest anticipated operational temperature.

11. A drilling fluid for reducing or controlling seepage losses to a permeable underground formation in a process of drilling a well in an oil or gas recovery operation, the drilling fluid comprising:
    a base fluid; and
    a seepage loss agent consisting of wax particles selected from the group consisting of natural wax particles, synthetic wax particles and a mixture of natural and synthetic wax particles, each of said wax particles having a particle size greater than 50 microns and being substantially insoluble in the drilling fluid and in hydrocarbons at temperatures below the melt point of the wax particles,
    wherein the wax particles remain substantially solid during the drilling process.

12. The drilling fluid of claim 11, wherein the base fluid is a hydrocarbon base fluid or an invert emulsion.

13. The drilling fluid of claim 11, wherein the base fluid is an aqueous base fluid or an aqueous based emulsion.

14. The drilling fluid of claim 11, wherein the particles have a melt point above operational temperatures encountered during drilling.

15. The drilling fluid of claim 14, wherein the particles have a melt point below a temperature in the underground formation.

16. The drilling fluid of claim 11, wherein all or a majority of the particles are in the range of 100 microns to about 5000 microns.

17. The drilling fluid of claim 11, wherein the seepage loss agent consists essentially of particles of refined mineral wax 18. The drilling fluid of claim 17, wherein the refined mineral wax is selected from the group consisting of paraffin waxes, microcrystalline waxes and mixtures thereof.

19. The drilling fluid of claim 11, wherein the particles comprise a mixture of particles of two or more different particle sizes.

20. The drilling fluid of claim 19, wherein the particles comprise a mixture of refined paraffin wax particles and refined microcrystalline wax particles, wherein the microcrystalline particles are larger than the paraffin particles.

21. The drilling fluid of claim 11, which is viscosified and wherein the seepage loss agent is dispersed in the drilling fluid without the use of surface active agents, stabilizers and emulsifiers.

22. The drilling fluid of claim 11, wherein the seepage loss agent is in the drilling fluid in a concentration of about 5 $kg/m^3$ to about 20 $kg/m^3$.

* * * * *